US010841136B1

(12) United States Patent
McCoy (10) Patent No.: US 10,841,136 B1
(45) Date of Patent: Nov. 17, 2020

(54) ASYMMETRIC FACTORIZATION OF GENERALIZED RAISED COSINE FILTERS FOR IMPROVED SELECTIVITY

(71) Applicant: National Instruments Corporation, Austin, TX (US)

(72) Inventor: James Wesley McCoy, Leander, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 16/540,838

(22) Filed: Aug. 14, 2019

(51) Int. Cl.
H04L 25/03 (2006.01)

(52) U.S. Cl.
CPC .... H04L 25/03853 (2013.01); H04L 25/0384 (2013.01); H04L 25/03261 (2013.01)

(58) Field of Classification Search
CPC . H04L 27/2601; H04L 5/0007; H04L 1/0003; H04L 1/0009; H04L 1/0041; H04L 1/0045; H04L 25/03006; H04L 25/03853; H04L 25/03261; H04L 25/0384; H04L 25/03828; H04L 25/03859; H04L 27/366; H04B 7/0413; H04W 52/262
See application file for complete search history.

(56) References Cited

U.S. PATENT DOCUMENTS

| | | | |
|---|---|---|---|
| 4,731,800 A | 3/1988 | Motley et al. | |
| 5,487,089 A | 1/1996 | Misaizu et al. | |
| 6,373,955 B1 | 4/2002 | Hooley | |
| 6,628,728 B1 | 9/2003 | McCarty, Jr. | |
| 8,325,755 B2 | 12/2012 | Lee et al. | |
| 9,191,161 B2 | 11/2015 | Li et al. | |
| 10,103,928 B2 | 10/2018 | McCoy et al. | |
| 2007/0281633 A1 | 12/2007 | Papadopoulos | |
| 2015/0326286 A1 | 11/2015 | Wong et al. | |
| 2015/0326291 A1 | 11/2015 | Wong et al. | |
| 2015/0326383 A1 | 11/2015 | Wong et al. | |
| 2017/0290013 A1 | 10/2017 | McCoy et al. | |

OTHER PUBLICATIONS

Alagha et al. "Generalized Raised-cosine filters"; Jul. 1999, IEEE transcations on communications. vol. 47. No. 7 pp. 989-997.*
Vieira et al., *"Reciprocity Calibration Methods for Massive MIMO Based on Antenna Coupling"*, Department of Electrical Engineering, Lund University, Jan. 1, 2014, pp. 1-5.
Harris et al., *"University of Bristol and Lund University Partner with NI to Set World Records in 5G Wireless Spectral Efficiency Using Massive MIMO"*, dowloaded from www.ni.com, May 2016, pp. 1-7.

(Continued)

*Primary Examiner* — Rahel Guarino
(74) *Attorney, Agent, or Firm* — Eric W. Cernyar; James W. Huffman (57) ABSTRACT

An apparatus to transmit and receive wireless communications is disclosed in which the transmit circuitry includes a square root raised cosine filter to pulse shape modulate signals and the receive circuitry includes a higher order Nyquist receive filter coupled to receive the input signals and remove the pulse shaping modulation. The cascaded combination of the transmit and receive filters has a frequency response equivalent to a higher order generalized raised cosine filter response.

18 Claims, 2 Drawing Sheets

(56) References Cited

OTHER PUBLICATIONS

"LTE in a Nutshell—Physical Layer", Telesystem Innovations Inc. White Paper, 2010, pp. 1-18.
"An Introduction to Orthogonal Frequency Division Multiplex Technology", Keithley Instruments, Inc., 2008, pp. 1-66.
HUAWEI, "WF on CSI Acquisition in NR", 3GPP TSG RAB WG1 Meeting #85, May 23-27, 2016, pp. 1-4.
HUAWEI et al., "WF on CSI Acquisition Framework in NR", 3GPP TSG RAN WG1 Meeting #85, May 23-27, 2016, pp. 1-3.
"Study on Latency Reduction Techniques for LTE", 3GPP TR 36.881 Vo.6.0 Technical Report, Feb. 2016, pp. 1-92.
"Study on Scenarios and Requirements for Next Generation Access Technologies", 3GPP TR 38.913 Vo.2.0, Feb. 2016, pp. 1-19.
Vieira et al., "A Flexible 100-Antenna Testbed for Massive MIMO", Department of Electrical Information Technology at Lund University, Jan. 1, 2014, pp. 1-7.
"Bristol and Lund Set a New World Record in 5G Wireless Spectrum Efficiency" Bristol Univeristy, News, March: Massive MIMO demonstration, Mar. 23, 2016, pp. 1-6.
"Study on NR New Radio Access Technology", 3GPP TSG RAN Meeting #71, Goteborg, Sweden, Mar. 7-10, 2016, pp. 1-8.
"LTE Small Cell Enhancement by Dual Connectivity", Wireless World Research Forum, Outlook Visions and Research Directions for the Wireless World, Whitepaper, Nov. 2014, pp. 1-22.
"LTE in a Nutshell: Protocol Architecture" Telesystem Innovations Inc. White Paper, 2010, pp. 1-12.
"LTE Random Access Procedure" http://www.eventhelix.com/eventstudio/, 2015, pp. 1-5.
Luther, "5G Massive MIMO Testbed: From Theory to Reality", National Instruments, Jun. 8, 2016, pp. 1-11.
"Introduction to the NI mmWave Transceiver System Hardware", National Instruments, Apr. 20, 2016, pp. 1-8.
"National Instruments Wireless Research Handbook", National Instruments, May 2016, pp. 1-37.
Shepard et al. "Argos: Practical Many-Antenna Base Stations" MobiCom 12, Aug. 22-26, 2012, Istanbul, Turkey, pp. 53-64.
Khoolenjani, et al. "Distribution of the Ratio of Normal and Rice Random Variables" Digital Commons @WayneState, Journal of Modern Applied Statistical Methods, vol. 12, Issue 2, Article 27, Nov. 1, 2013, pp. 1-15.
Shen et al. "Channel Estimation in OFDM Systems", Freescale Semiconductor, Inc. Application Note, Jan. 2006, pp. 1-16.

* cited by examiner

ASYMMETRIC FACTORIZATION OF GENERALIZED RAISED COSINE FILTERS FOR IMPROVED SELECTIVITY

TECHNICAL FIELD

This application relates to signal filtering, and more particularly, to signal filtering in wireless communications.

BACKGROUND

In electronics and telecommunications, pulse shaping is applied to signals to limit the effective bandwidth of the signal's transmission in order to minimize intersymbol interference (ISI). ISI is a form of distortion of a signal in which one symbol interferes with subsequent symbols. Pulse shaping involves shaping the transmitted signals so that they occupy less bandwidth, thereby keeping intersymbol interference under control.

Common idealized forms of pulse shaping are the sinc filter (aka boxcar filter), the Gaussian filter, and the Nyquist filter. In practice, these idealized filters can only be approximated.

A Nyquist filter is a general term used for a filter with a specific property of bring able to recover data filtered with a zero inter-symbol interference (ISI) property. One approximation of the Nyquist filter is the raised cosine (RC) filter. RC filters often suffer from poor smoothness properties that can degrade performance in pulse shaping for wireless communications. In order to improve tolerance for noise in the system, the RC filter is sometimes implemented using two cascaded square-root RC filters, one on the sender side and one on the receiver side. Because the filters' amplitude responses are pointwise square roots of an RC filter, pulse shaping is equally distributed between the sender and receiver filters.

U.S. Pat. No. 10,103,928, which issued on Oct. 16, 2018 and is incorporated herein by reference, describes the use of Nyquist and Square Root Nyquist Filters for pulse shaping in wireless communications. That patent disclosed advantages to using higher order raised cosine filters. In particular, a generalized raised cosine (GRC) filter consisting of matched transmit and receiver filters had improved time-frequency localization compared with a raised cosine filter (RC) filter. However, there has been a great deal of inertia in the industry against replacing a square root raised cosine filter at the transmitter with another filter design.

SUMMARY

There is need to improve receiver selectivity performance in a split RC filter while enabling the industry to continue employing root raised cosine filters at the transmitter. The description herein sets forth embodiments that use asymmetric factorization of higher order Nyquist structures with square root raised cosine at the transmitter and the remaining factors of the higher order Nyquist filter at the receiver.

Accordingly, the disclosure herein distinguishes itself from that of U.S. Pat. No. 10,103,928 by focusing on a special case where the transmit filter is separated out from the rest of the composite filter response. More specifically, this disclosure considers the case where the transmit filter is a square root raised cosine filter (which the industry is wont to keep) and the receiver is something else and higher order. This disclosure demonstrates the possibility of employing root raised cosine at the transmitter while still enjoying the benefits of improved selectivity of higher order raised cosine filters at the receiver. These benefits are effectively accomplished by rolling over a $\cos(z/2)$ term from an idealized $\cos^2(z/2)$ transmit filter response to the receive side, which results in an improved response at the receiver.

In one embodiment, an apparatus to receive wireless communications is disclosed including an antenna, receive circuitry coupled to receive input signals from the antenna that have a pulse shaping modulation, and a receive filter within the receive circuitry coupled to receive the input signals and to remove the pulse shaping modulation, where the receive filter is an asymmetric factorization of a higher order generalized Nyquist filter that has a frequency response ($H(f)$) represented by frequency response equations. The cascaded combination of the transmit and receive filters has a frequency response equivalent to a higher order generalized raised cosine filter response.

The asymmetric partition of a higher order Nyquist receive filter has a frequency response $R_n(f)$ given by:

$$R_n(f) = \begin{cases} \sqrt{\dfrac{T}{2}}, & |f| \le (1-\beta)/2T \\ R_n(z), & \dfrac{1-\beta}{2T} < |f| \le \dfrac{1+\beta}{2T} \\ 0, & \text{else} \end{cases}$$

wherein n represents the order of the higher order receive filter and is greater than or equal to one, $$Z = \dfrac{\pi T}{\beta}\left[|f| - \dfrac{1-\beta}{2T}\right],$$

the roll-off transition region is defined by $$\dfrac{1-\beta}{2T} < |f| \le \dfrac{1+\beta}{2T},$$

$f$ represents frequency, T is the symbol period, $\beta$ represents a roll-off factor; and $$R_n(z) = \begin{cases} 0, & z = \pi \\ \dfrac{\sqrt{T/2}}{2\cos(z/2)}[A_0 + A_1\cos(z) + \ldots + A_{2n+1}\cos((2n+1)z)] \end{cases}.$$

Furthermore, the coefficients $A_n$ for the frequency response $R_n(z)$ of the receive filter may satisfy a matrix $M(n)$ for any given integer n, wherein:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

In one implementation, the receive filter is implemented in the time domain. In another implementation, the receive filter is implemented in the frequency domain. In various implementations, the apparatus further comprises a decoder within the receive circuitry coupled to receive filtered signals from the receive filter and to output decoded signals and MAC (media access control) circuitry coupled to receive the decoded signals from the decoder and to output processed signals through an external interface.

In another embodiment, the receive filter comprises a linear combination of higher order Nyquist subfilters. For instance, the receive filter may comprise a combination of nth-order sub-filters, each sub-filter having a frequency response $R_k(z)$ in a roll-off transition region, and the combination of sub-filters has a frequency response $R_C(z)$, in which $$R_C(z) = \sum_{k=0}^{m} \alpha_k R_k(z)$$

for a combination of m sub-filters, $\alpha_0$ through $\alpha_m$ are coefficients that represent weights of the different order Nyquist filters, each having a value greater than or equal to 0, that add up to one; and $R_k(z)$ represents the frequency responses of the sub-filters. Furthermore, the frequency responses of the sub-filters may be characterized by the equation $$R_k(f) = \begin{cases} \sqrt{\frac{T}{2}}, & |f| \leq (1-\beta)/2T \\ R_k(z), & \frac{1-\beta}{2T} < |f| \leq \frac{1+\beta}{2T} \\ 0, & \text{else} \end{cases}$$

wherein $R_k(z) = \begin{cases} 0, & z = \pi \\ \frac{\sqrt{T/2}}{2\cos(z/2)}[A_0 + A_1\cos(z) + A_3\cos(3z) + \ldots + \\ \qquad A_{2k+1}\cos((2k+1)z)] \end{cases}$ wherein each value k uniquely designates one of the nth-order sub-filters, and the remaining variables are defined as above.

In another embodiment, a higher order generalized raised cosine cascaded filter comprises both a root raised cosine transmit filter and a higher order receive filter, wherein n represents the order of the higher order receive filter and n is greater than or equal to one. In one implementation, the transmit filter is a square root raised cosine filter, and the frequency response X(z) of the transmit filter is expressed by the following:

$$X(f) = \begin{cases} \sqrt{T/2}, & |f| \leq (1-\beta)/2T \\ \sqrt{T/2}\cos(z/2), & \frac{1-\beta}{2T} < |f| \leq \frac{1+\beta}{2T} \\ 0, & \text{else} \end{cases}$$

wherein $f$ represents the frequency of a signal transmitted through the higher order generalized raised cosine cascaded filter and the remaining variables are defined as above.

In another implementation, the frequency response H(z) of the higher order generalized cosine cascaded filter is given by the formula $H(z)=X(z)*R(z)$, where X(z) is a frequency response of the root raised cosine filter and R(z) is a frequency response of the n-order receive filter, and the remaining variables are as defined above. In yet another implementation, $$X(z) = \sqrt{\frac{\tau}{2}} \cos\left(\frac{Z}{2}\right).$$

In yet another embodiment, a method of wireless communication is provided comprising receiving signals that have been pulse-shape modulated by a root-raised cosine transmit filter of a transmitter and filtering the signals with a receive filter to remove the pulse shaping modulation, wherein the receive filter is a is a higher order Nyquist filter, and the cascaded combination of the transmit and receive filters has a frequency response equivalent to a higher order generalized raised cosine filter response. The method may further involve applying pulse-shaping modulation to pre-transmitted signals using the root-raised cosine transmit filter to generate transmit signals having the pulse shaping modulation, and transmitting the signals through a transmit antenna.

The method is also applicable to a receive filter comprising a linear combination of nth-order sub-filters, each sub-filter having a frequency response ($R_k(z)$) in a roll-off transition region, and the combination of sub-filters has a frequency response ($R_C(z)$), as represented by the equations described above.

In one embodiment, the invention is applied to 5G New Radio, where there has been an emphasis on improved spectral occupancy. It is possible with higher order raised cosine filters to improve the spectral occupancy because it is the ability of the cascaded filters to prevent adjacent channel leakage, not just the transmit filter.

Other systems, devices, methods, features, and advantages of the disclosed product and methods for pulse shaping will be apparent or will become apparent to one with skill in the art upon examination of the following figures and detailed description. All such additional systems, devices, methods, features, and advantages are intended to be included within the description and to be protected by the accompanying claims.

BRIEF DESCRIPTION OF THE DRAWINGS

The present disclosure may be better understood with reference to the following figures. Corresponding reference numerals designate corresponding parts throughout the figures, and components in the figures are not necessarily to scale.

It will be appreciated that the drawings are provided for illustrative purposes and that the invention is not limited to the illustrated embodiment. For clarity and in order to emphasize certain features, not all of the drawings depict all of the features that might be included with the depicted embodiment. The invention also encompasses embodiments that combine features illustrated in multiple different drawings; embodiments that omit, modify, or replace some of the features depicted; and embodiments that include features not illustrated in the drawings. Therefore, it should be understood that there is no restrictive one-to-one correspondence between any given embodiment of the invention and any of the drawings.

DETAILED DESCRIPTION

The present invention discloses embodiments of an imbalanced split RC filter comprising a lower-order filter, such as a root-raised cosine (RC) filter, at the transmitter paired with a higher order filter, such as a Nyquist filter, at the receiver. While one embodiment presents a general transmit/receive architecture for wireless communications, it will be understood that the Nyquist filter structures described herein can be used in a wide variety of applications and system implementations. It is noted that different and/or additional features can also be implemented, as desired, and related systems and methods can be utilized as well. It is further noted that example Nyquist filters and raised cosine filters are described, for example, in U.S. Pat. Nos. 6,628,728, 5,487,089, and 4,731,800, each of which is hereby incorporated by reference in its entirety.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (e.g., spatial dimensions) may be used explicitly or implicitly herein as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

In describing preferred and alternate embodiments of the technology described herein, specific terminology is employed for the sake of clarity. Technology described herein, however, is not intended to be limited to the specific terminology so selected, and it is to be understood that each specific element includes all technical equivalents that operate similarly to accomplish similar functions.

Figure 1:
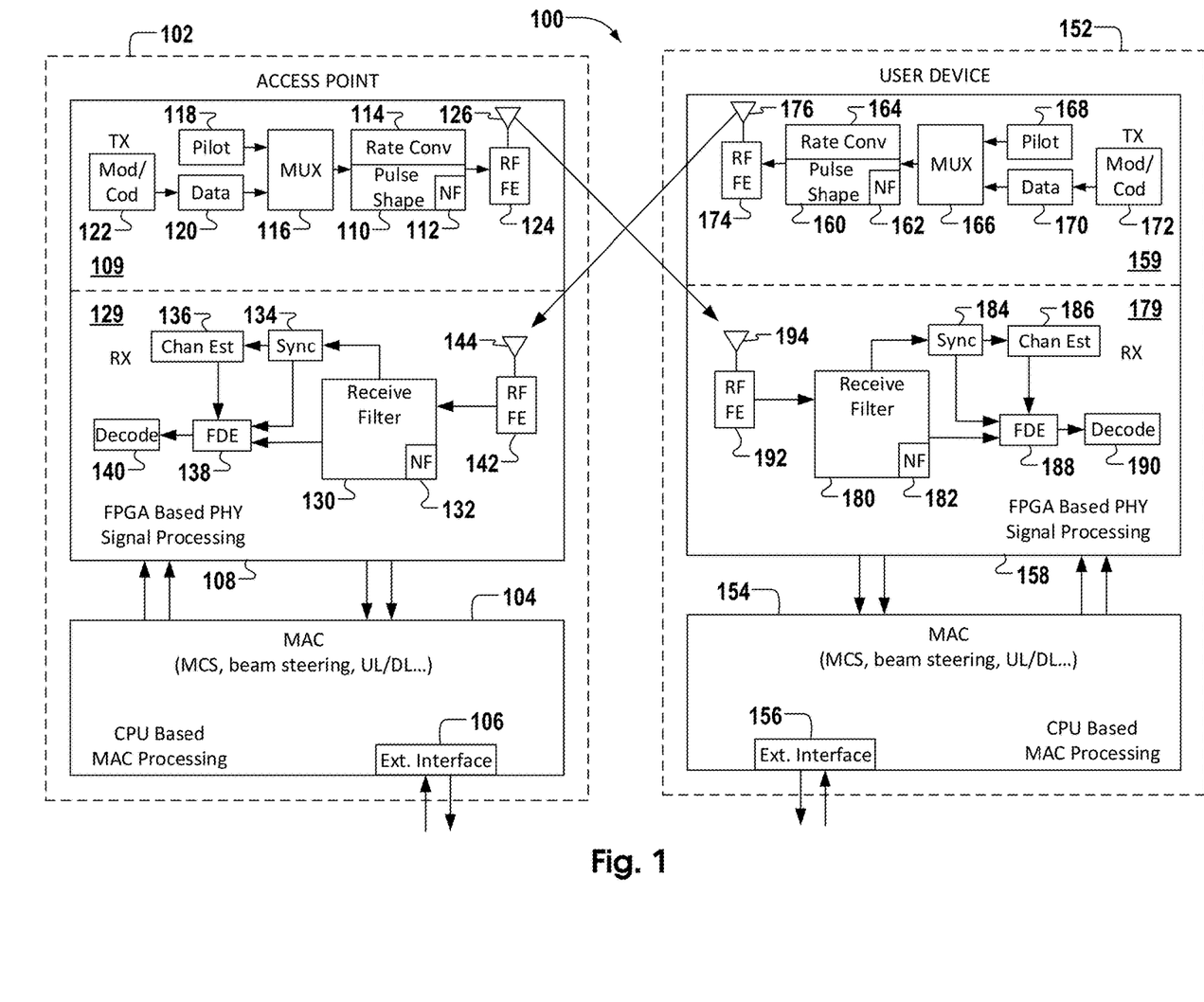
FIG. 1 is a block diagram of one embodiment of a transmit and receive architecture for wireless access points and user devices within a wireless communications system that can use the filter embodiments described herein.

FIG. 1 is a block diagram of one embodiment 100 of a transmit and receive architecture for wireless access points and user devices 102/152 within a wireless communication system. The example wireless access point 102 and user device 152 each include CPU (central processing unit) based MAC (media access control) processing 104/154 and FPGA (field programmable gate array) based transmit/receive (TX/RX) physical layer (PHY) signal processing 108/158.

The transmit (TX) path circuitry 109/159 for the access point 102 and the user device 152 includes a modulator/coder (Mod/Cod) 122/172 that modulates and/or codes data 120/170 onto a carrier signal that is combined with pilot signal 118/168 by a multiplexer (MUX) 116/166 and provided to output circuitry. The output circuitry further provides rate converter 114/164, pulse shape filter 110/160, and/or other functions to the transmit signals (e.g., carrier plus pilot) prior to the signal being transmitted through an antenna 126/176 to the receive section 129/179 of the other system. As described herein, a Nyquist filter 112/162 and more particularly a square root raised cosine filter is used to add the pulse shaping modulation to the transmit signals. Further, output circuitry for the transmit path circuitry 109/159 optionally includes a radio frequency front-end (RFFE) 124/174 that provides digital-to-analog converters, up-conversion mixers, power amplifiers, and/or other output circuitry that facilitates the transmission of the wireless signals through the antenna 126/176 that have been modulated using the pulse shaping function applied by the pulse shape filter 112/162.

Each receive (RX) path circuitry 129/179 for the access point 102 and the user device 152 receives the transmitted wireless signals (e.g., carrier and pilot signal) through an antenna 144/194 and provides it to a receive filter 130/180. The receive filter 130/180 is an asymmetric partition of a higher order (n>=1) generalized Nyquist filter, examples of which are provided further below, that removes the pulse shaping modulation provided by the pulse shape filter 112/162 and outputs a filtered signal to a frequency domain equalization (FDE) module 138/188. A synchronization (SYNC) block 134/184 also receives the filtered signal and provides a synchronization signal to the channel estimator (Chan Est) 136/186 and the FDE module 138/188. The channel estimator 136/186 provides a received signal strength estimate to the FDE module 138/188. The output of the FDE module 138/188 is provided to the decoder (DE-CODE) 140/180 which decodes and demodulates the received signals. Further, input circuitry for the receive path circuitry 129/179 optionally includes a radio frequency front-end (RFFE) 142/192 that provides analog-to-digital converters, down-conversion mixers, low noise amplifiers, and/or other input circuitry that facilitates the reception of the wireless signals through the antenna 144/194.

The MAC processing circuitry 104/154 for the access point 102 and the user device 152 includes one or more processing features such as mobile communication services (MCS), beam steering, uplink (UL) control, downlink (DL) control, and/or other MAC processing features. The MAC processing circuitry 104/154 also provides an external communication interface 106/156, for example, to other processing circuits such as host processors. The TX/RX signal processing circuitry 108/158 and MAC processing circuitry 104/154 optionally communicate information with each other such as MAC parameters, payload information, PHY measurements, decoded data, and/or other desired information.

The Nyquist filters described below can be used, for example, with respect to the pulse shape filter 110/160 in the transmit (TX) path circuitry 109/159 and/or with respect to the receive filter 130/180 in the receive (RX) path circuitry 129/179 for the example embodiment provided in FIG. 2. Further, it is noted that disclosed embodiments can be used in a variety of communication systems having one or more Nyquist filters and/or square root Nyquist filters. Such communications can include, for example, single carrier, OFDM (orthogonal frequency division multiplexing) systems, f-OFDM (filtered-OFDM) systems, GFDM (generalized frequency division multiplexing) systems, UFMC (universal filtered multi-carrier) systems, and/or types of wireless communication systems that use Nyquist filters or square root Nyquist filters for pulse shaping of transmitted signals.

In various embodiments of the invention, a higher order generalized raised cosine filter is provided that comprises a square root raised cosine filter at the transmitter paired a high order Nyquist filter at the receiver. The following paragraphs construct a mathematical model of the frequency response of the cascaded filter for different orders of receiver filters. Each combination constitutes a separate embodiment of the invention.

The following paragraphs characterize the frequency response H(z) of the cascaded filter in the roll-off transition region:

$$\frac{1-\beta}{2T} < |f| \le \frac{1+\beta}{2T}, \quad (1)$$

where $f$ represents the frequency of the signal, T is the symbol period, and # represents a roll-off factor for the frequency response equations.

Because the cascaded filter comprises a transmitter filter paired with a receiver filter, the cascaded filter transitional region's frequency response H(z) equals the product of the frequency response X(z) of the transmitter filter and the frequency response R(z) of the receiver filter in the transition region, as in:

$$H(z)=X(z)R(z) \quad (2)$$

H(z) is further characterized by the following formula:

$$H(z) = \frac{T}{4}\{A_0 + A_1\cos(z) + A_3\cos(3z) + \ldots + A_{2n+1}\cos((2n+1)z)\} \quad (3)$$

where n represents the order of an nth order filter. The value n designates the Fourier series components and their amplitude coefficients—or, to state it another way, $A_n$ are coefficients and cos(nz) are the frequency components of the Fourier series. The value z is defined by the following formula:

$$z = \frac{\pi T}{\beta}\left[|f| - \frac{1-\beta}{2T}\right]. \quad (4)$$

H(z) only defines the frequency response in the transition region. More generally, the frequency behavior or response H(f) of the raised-cosine filter for all values of $f$ is defined as:

$$H(f) = \begin{cases} \frac{T}{2}, & |f| \le (1-\beta)/2T \\ H_n(z), & \frac{1-\beta}{2T} < |f| \le \frac{1+\beta}{2T} \\ 0, & \text{else} \end{cases} \quad (5)$$

This filter could equivalently be implemented in the time domain by taking the inverse Fourier transform of H(f).

In the following paragraphs, the frequency response H(z) of the cascaded filter which includes a root raised cosine filter at the transmitter—is constructed for the cases of n=0, 1 and 2 which represent the order of the receive filter.

For the trivial case n=0 where direct square root factorization applies, $R_0(z)$ constitutes the zero-order receive filter. The value for T was set to 1 without loss of generality. The values H(z) and R(z) for this case are represented as follows:

$$H_0(z) = X(z) * R_0(z) = \sqrt{\frac{T}{2}}\left[\cos\left(\frac{Z}{2}\right)\right] * \sqrt{\frac{T}{2}}\left[\cos\left(\frac{Z}{2}\right)\right] \quad (6)$$

$$R_0(z) = \sqrt{\frac{T}{2}}\cos\left(\frac{Z}{2}\right) \quad (7)$$

For n=1 in the transition region of the frequency domain:

$$H_1(z) = \frac{T}{4}\left(1 + \frac{9}{8}\cos(1z) - \frac{1}{8}\cos(3z)\right) = \quad (8)$$

$$\sqrt{\frac{T}{2}}\left[\cos\left(\frac{Z}{2}\right)\right] * \sqrt{\frac{T}{2}}\left[\left(3 - 2\cos^2\left(\frac{Z}{2}\right)\right)\cos^3\left(\frac{Z}{2}\right)\right]$$

$$R_1(z) = \sqrt{\frac{T}{2}}\left[\left(3 - 2\cos^2\left(\frac{Z}{2}\right)\right)\cos^3\left(\frac{z}{2}\right)\right] \quad (9)$$

characterizes the frequency response of the first order receive filter.

For n=2:

$$H(z) = \frac{T}{4}\left(1 + \frac{75}{64}\cos(1z) - \frac{25}{128}\cos(3z) + \frac{3}{128}\cos(5z)\right) = \quad (10)$$

$$\sqrt{\frac{T}{2}}\cos\left(\frac{Z}{2}\right) * \sqrt{\frac{T}{2}}\cos^5\left(\frac{Z}{2}\right)\left(10 - 15\cos^2\left(\frac{Z}{2}\right) + 6\cos^4\left(\frac{Z}{2}\right)\right)$$

$$R_2(z) = \sqrt{\frac{T}{2}}\cos^5\left(\frac{Z}{2}\right)\left(10 - 15\cos^2\left(\frac{Z}{2}\right) + 6\cos^4\left(\frac{Z}{2}\right)\right). \quad (11)$$

The equations (6), (8), and (10) above are derived from trigonometric identities of equation (3). Accordingly, the asymmetric partition of a higher order Nyquist receive filter has a frequency response $R_n(f)$ given by:

$$R_n(f) = \begin{cases} \sqrt{\frac{T}{2}}, & |f| \le (1-\beta)/2T \\ R_n(z), & \frac{1-\beta}{2T} < |f| \le \frac{1+\beta}{2T} \\ 0, & \text{else} \end{cases} \quad (12)$$

wherein n represents the order of the higher order Nyquist receive filter and is greater than or equal to one;

$$Z = \frac{\pi T}{\beta}\left[|f| - \frac{1-\beta}{2T}\right];$$

the roll-off transition region is defined by $$\frac{1-\beta}{2T} < |f| \le \frac{1+\beta}{2T}; f$$

represents frequency; T is the symbol period; β represents a roll-off factor; and:

$$R_n(z) = \begin{cases} 0, & z = \pi \\ \dfrac{\sqrt{T/2}}{2\cos(z/2)}[A_0 + A_1\cos(z) + \ldots + A_{2n+1}\cos((2n+1)z)] \end{cases}.$$

As seen above, for all cases of n and for all n-order filters of this type, the root raised cosine transmitter filter has a frequency response X(f) given by the following equation:

$$X(f) = \begin{cases} \sqrt{T/2}, & |f| \leq (1-\beta)/2T \\ \sqrt{T/2}\cos(z/2), & \dfrac{1-\beta}{2T} < |f| \leq \dfrac{1+\beta}{2T}; \\ 0, & \text{else} \end{cases} \quad (12)$$

wherein $f$ represents the frequency of a signal transmitted through the higher order generalized raised cosine cascaded filter; T is the symbol period; $\beta$ represents a roll-off factor; and z is given by the equation $$Z = \frac{\pi T}{\beta}\left[|f| - \frac{1-\beta}{2T}\right].$$

Unlike the transmit filter, the receive filter is characterized differently for each value of n. More specifically, the values of the coefficients $A_n$ for the frequency response $R_n(z)$ of the receive filter satisfy a square Vandermonde matrix M(n) for the order n of the receive filter, where n is an integer of at least 1 and:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix} \quad (13)$$

These values are determined by solving the system of equations generated by eq. (13). For example, for n=1, a 2×2 matrix is used where $A_1 + A_3 = 1$ and $A_1 + 9A_3 = 0$, the solution for which is $A_1 = 9/8$ and $A_3 = -1/8$, which is consistent with eq. (8).

For the case of n=3, there are four simultaneous equations where:

$1A_1 + 1A_3 + 1A_5 + 1A_7 = 1$ $1^2A_1 + 3^2A_3 + 5^2A_5 + 7^2A_7 = A_1 + 9A_3 + 25A_5 + 49A_7 = 0$ $1^{2*2}A_1 + 3^{2*2}A_3 + 5^{2*2}A_5 + 7^{2*2}A_7 = A_1 + 81A_3 + 625A_5 + 2402A_7 = 0$ $1^{2*3}A_1 + 3^{2*3}A_3 + 5^{2*3}A_5 + 7^{2*3}A_7 = A_1 + 729A_3 + 15625A_5 + 117649A_7 = 0$

Solving for these four variables yields the following:

$$A_1 = \frac{352545}{294688}, A_3 = \frac{-141055}{589376}, A_5 = \frac{28221}{589376}, A7 = \frac{-45}{9209}$$

By rearranging eq. (2) and substituting cos (for X(z), one can solve for R(z). Accordingly, the higher order Nyquist receive filter has a frequency response (R(z)) in a roll-off transition region given by:

$$R(z) = \begin{cases} 0, & z = \pi \\ \dfrac{\sqrt{T/2}}{2\cos\left(\dfrac{Z}{2}\right)} \{A_0 + A_1\cos(z) + A_3\cos(3z) + \ldots + A_{2n+1}\cos((2n+1)z)\} & \text{else} \end{cases}; \quad (15)$$

wherein n represents the order of the higher order receive filter and is greater than or equal to one, $$Z = \frac{\pi T}{\beta}\left[|f| - \frac{1-\beta}{2T}\right],$$

the roll-off transition region is defined by $$\frac{1-\beta}{2T} < |f| \leq \frac{1+\beta}{2T},$$

$f$ represents frequency; T is the symbol period, and $\beta$ represents a roll-off factor.

In other embodiments, the frequency response of the receive filter is given by a linear combination of higher order terms with this factorization for a full design space of filter options. The composite frequency response $R_C(z)$ of such receive filters is expressed as follows:

$$R_C(z) = \sum_{k=0}^{m} \alpha_k R_k(z) \quad (14)$$

$= \alpha_0 R_0(z) + \alpha_1 R_1(z) + \alpha_2 R_2(z) + \ldots + \alpha_m R_m(z)$ wherein for any given coefficient $\alpha_k$, $\alpha_k \geq 0$, and the sum of those coefficients equals one, as in $\alpha_0 + \alpha_1 + \alpha_2 + \ldots + \alpha_m = 1$.

The frequency responses of the sub-filters are characterized by the equation:

$$R_k(z) = \begin{cases} 0, & z = \pi \\ \dfrac{\sqrt{T/2}}{2\cos\left(\dfrac{z}{2}\right)}\{A_0 + A_1\cos(z) + A_3\cos(3z) + \ldots + A_{2n+1}\cos((2n+1)z)\}, & \text{else} \end{cases}; \quad (17)$$

where n represents the order of the higher order receive sub-filter and is greater than or equal to one, each value k uniquely designates one of the nth-order sub-filters, $A_0$, $A_1$, $A_3$, ... $A_{2n+1}$ represent cosine coefficients for each sub-filter, $$z = \frac{\pi T}{\beta}\left[|f| - \frac{1-\beta}{2T}\right],$$

$f$ represents frequency; T is a symbol period, $\beta$ represents a roll-off factor; and the roll-off transition region is defined by:

$$\frac{1-\beta}{2T} < |f| \leq \frac{1+\beta}{2T}.$$

Moreover, the cosine coefficients $A_0$, $A_1$, $A_3$ of each subfilter satisfy the matrix M(n) set forth in eq. (13).

Figure 2:
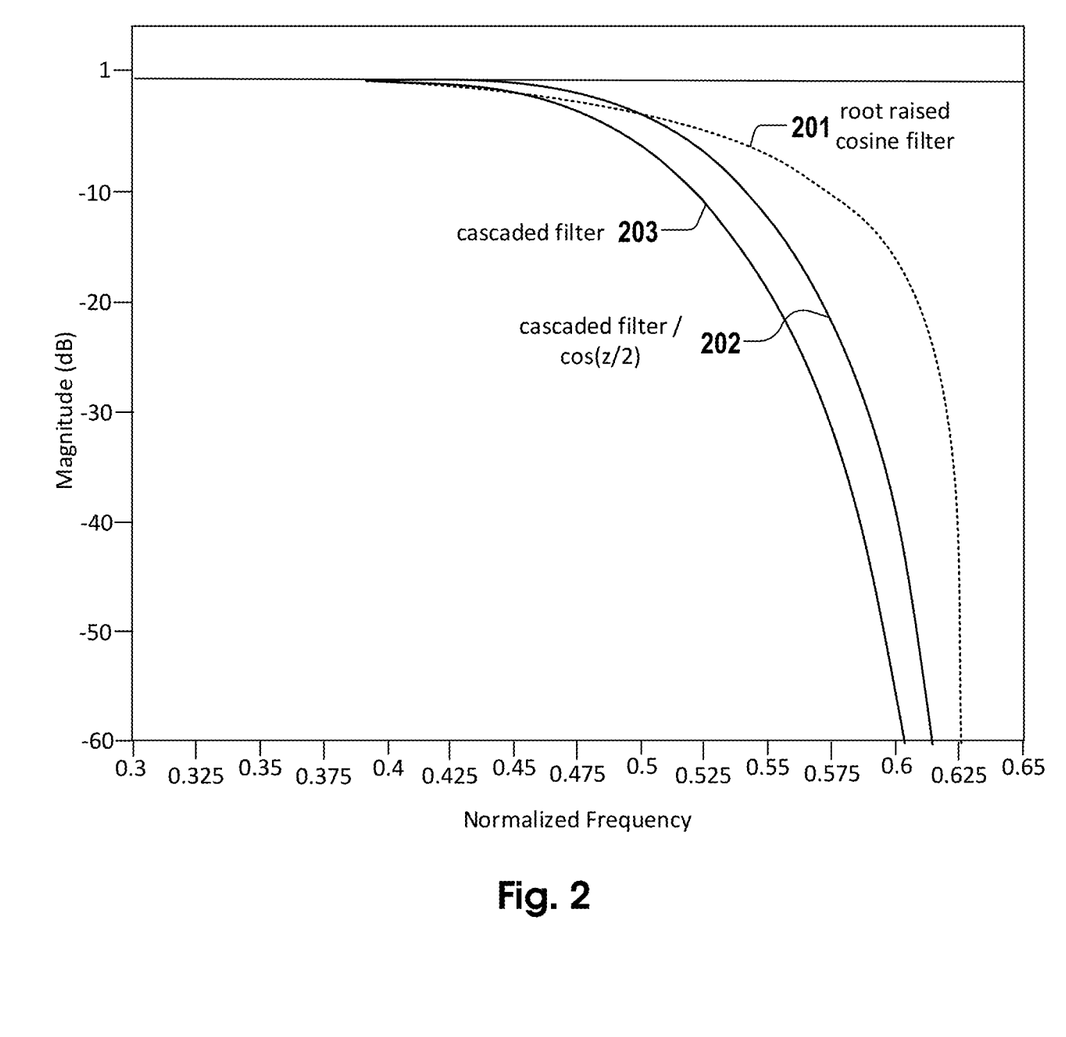
FIG. 2 is a graph that illustrates the frequency responses of a transmitter root-raised cosine filter, a receiver higher order filter, and their combination into a cascaded filter.

FIG. 2 illustrates the close-in adjacent channel response 201 of a first order cascaded filter with a frequency response H(f) of $0.95H_1(f)+0.05H_2(f)$ and a roll-off factor $\beta=0.25$ FIG. 2 also illustrates the channel response 203 of a root raised cosine transmit filter and the quotient response 202 of the cascaded filter response 201 divided by the transmit response 203. In a wireless receiver, the first filter is called a selectivity filter which has the responsibility of rejecting adjacent channel interference. By using the composite higher order factorization, far superior adjacent channel rejection is obtained (by up to 25 dB at some points). This is because the cascaded filter is a higher order generalized raised cosine filter.

It is noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

I claim:

1. An apparatus to receive wireless communications from a transmitter transmitting signals using a root-raised cosine transmit filter, the apparatus comprising:
   an antenna;
   receive circuitry coupled to receive input signals from the antenna, the input signals having been pulse shaped modulated by the root-raised cosine transmit filter; and
   a receive filter within the receive circuitry coupled to receive the input signals and to remove the pulse shaping modulation, wherein the receive filter is an asymmetric partition of a higher order (n>=1) generalized Nyquist filter;
   wherein a cascaded combination of the transmit and receive filters has a frequency response equivalent to a higher order generalized raised cosine filter response.

2. The apparatus of claim 1, wherein:
   the asymmetric partition of the higher order generalized Nyquist filter at the receive filter has a frequency response at the receiver of $R_n(z)$ given by:

$$R_n(f) = \begin{cases} \sqrt{\frac{T}{2}}, & |f| \leq (1-\beta)/2T \\ R_n(z), & \frac{1-\beta}{2T} < |f| \leq \frac{1+\beta}{2T} \\ 0, & \text{else} \end{cases}$$

wherein:

$$R_n(z) = \begin{cases} 0, & z = \pi \\ \frac{\sqrt{T/2}}{2\cos(z/2)}[A_0 + A_1\cos(z) + \ldots + A_{2n+1}\cos((2n+1)z)] \end{cases};$$

n represents the order of the higher order generalized Nyquist receive filter and is greater than or equal to one;

$$z = \frac{\pi T}{\beta}\left[|f| - \frac{1-\beta}{2T}\right];$$

$\beta$ represents a roll-off factor that defines a roll-off transition region wherein:

$$\frac{1-\beta}{2T} < |f| \leq \frac{1+\beta}{2T};$$

$f$ represents frequency; and
$T$ is a symbol period.

3. The apparatus of claim 2, wherein the coefficients ($A_n$) for the frequency response $R_n(z)$ of the receive filter satisfy a matrix M(n) for any given integer n, wherein:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

4. The apparatus of claim 1, further comprising a decoder within the receive circuitry coupled to receive filtered signals from the receive filter and to output decoded signals.

5. The apparatus of claim 1, further comprising MAC (media access control) circuitry coupled to receive decoded signals from a decoder and to output processed signals through an external interface.

6. The apparatus of claim 1, wherein the receive filter comprises a linear combination of higher order Nyquist subfilters.

7. The apparatus of claim 1, wherein the receive filter comprises a combination of nth-order sub-filters, each sub-filter having a frequency response $R_k(z)$ in a roll-off transition region, and the combination of sub-filters has a frequency response $R_C(z)$, in which these terms are represented by the following equations and relationships:

$$R_C(z) = \sum_{k=0}^{m} \alpha_k R_k(z)$$

for a combination of m sub-filters;

$\alpha_0$ through $\alpha_m$ are coefficients that represent weights of the asymmetric partitions of different order Nyquist filters at the receiver, each having a value greater than or equal to 0, that add up to one; and $R_k(z)$ represent frequency responses of the sub-filters.

8. The apparatus of claim 7, wherein the frequency responses of the sub-filters are characterized by the equation:

$$R_k(f) = \begin{cases} \sqrt{\dfrac{T}{2}}, & |f| \le (1-\beta)/2T \\ R_n(z), & \dfrac{1-\beta}{2T} < |f| \le \dfrac{1+\beta}{2T} \\ 0, & \text{else} \end{cases}$$

wherein:

$$R_k(z) = \begin{cases} 0, & z = \pi \\ \dfrac{\sqrt{T/2}}{2\cos(z/2)}[A_0 + A_1\cos(z) + A_3\cos(3z) + \ldots + \\ \qquad A_{2k+1}\cos((2k+1)z)] \end{cases}$$

each value k uniquely designates one of the nth-order sub-filters;

$A_0, A_1, A_3, \ldots A_{2k+1}$ represent cosine coefficients for each sub-filter;

$$z = \dfrac{\pi T}{\beta}\left[|f| - \dfrac{1-\beta}{2T}\right];$$

$f$ represents frequency;
T is a symbol period;
$\beta$ represents a roll-off factor; and
a roll-off transition region is defined by:

$$\dfrac{1-\beta}{2T} < |f| \le \dfrac{1+\beta}{2T}.$$

9. The apparatus of claim 5, wherein the cosine coefficients $A_0, A_1, \ldots A_0$ for each sub-filter satisfy the matrix M(n) represented by:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

10. The apparatus of claim 1, wherein the receive filter is implemented in a time domain.

11. The apparatus of claim 1, wherein the receive filter is implemented in a frequency domain.

12. A higher order generalized raised cosine cascaded filter comprising:
a square root raised cosine transmit filter;
a higher order receive filter;
wherein:
n represents the order of the higher order receive filter and n is greater than or equal to one;
a frequency response X(z) of the square root raised cosine transmit filter is given by the following equation:

$$X(f) = \begin{cases} \sqrt{T/2}, & |f| \le (1-\beta)/2T \\ \sqrt{T/2}\cos(z/2), & \dfrac{1-\beta}{2T} < |f| \le \dfrac{1+\beta}{2T} \\ 0, & \text{else} \end{cases}$$

wherein: $f$ represents a frequency of a signal transmitted through the higher order generalized raised cosine cascaded filter;
T is a symbol period;
$\beta$ represents a roll-off factor; and
z is given by the following equation:

$$z = \dfrac{\pi T}{\beta}\left[|f| - \dfrac{1-\beta}{2T}\right].$$

13. A higher order generalized raised cosine cascaded filter comprising:
a square root raised cosine transmit filter;
a higher order receive filter;
wherein:
n represents the order of the higher order receive filter and n is greater than or equal to one;
in a roll-off transition region $$\dfrac{1-\beta}{2T} < |f| \le \dfrac{1+\beta}{2T},$$

a frequency response H(z) of the higher order generalized cosine cascaded filter is given by the following equation:

H(z)=X(z)*R(z);

$f$ represents frequency;
T is a symbol period; and
$\beta$ represents a roll-off factor;
X(z) is a frequency response of the root raised cosine transmit filter;
R(z) is a frequency response of the n-order receive filter; and z is given by the following equation:

$$z = \frac{\pi T}{\beta}\left[|f| - \frac{1-\beta}{2T}\right].$$

14. A higher order generalized raised cosine cascaded filter comprising:
   a square root raised cosine transmit filter; and
   a higher order receive filter;
   wherein:
      n represents the order of the higher order receive filter and n is greater than or equal to one; and
      a frequency response of the root raised cosine transmit filter is given by the following equation:

$$X(z) = \sqrt{\frac{T}{2}}\cos\left(\frac{z}{2}\right); \text{ wherein:}$$

T is a symbol period; and
   z is given by the following equation:

$$z = \frac{\pi T}{\beta}\left[|f| - \frac{1-\beta}{2T}\right].$$

15. A higher order generalized raised cosine cascaded filter comprising:
   a square root raised cosine transmit filter; and
   a higher order receive filter;
   wherein:
      n represents the order of the higher order receive filter and n is greater than or equal to one;

$$R(z) = \begin{cases} 0, & z = \pi \\ \frac{\sqrt{T/2}}{2\cos(z/2)}[A_0 + A_1\cos(z) + \ldots + A_{2n+1}\cos((2n+1)z)], & \text{else} \end{cases};$$

and
   the values of the coefficients $A_n$ for the receive filter satisfy a matrix M(n) for any given integer (n) represented by:

$$M(n)\begin{bmatrix} A_1 \\ A_3 \\ \vdots \\ A_{2n+1} \end{bmatrix} = \begin{bmatrix} 1 & 1 & \ldots & 1 \\ 1^2 & 3^2 & \ldots & (2n+1)^2 \\ \vdots & \vdots & \vdots & \vdots \\ 1^{2n} & 3^{2n} & \ldots & (2n+1)^{2n} \end{bmatrix}\begin{bmatrix} A_1 \\ A_3 \\ \vdots \\ A_{2n+1} \end{bmatrix} = \begin{bmatrix} 1 \\ 0 \\ \vdots \\ 0 \end{bmatrix}.$$

16. A higher order generalized raised cosine cascaded filter comprising:
   a square root raised cosine transmit filter; and
   a higher order receive filter;
   wherein:
      the root raised cosine transmit filter has a frequency response H(f) given by the following equation:

$$H(f) = \begin{cases} \frac{T}{2}, & |f| \leq (1-\beta)/2T \\ H(z), & \frac{1-\beta}{2T} < |f| \leq \frac{1+\beta}{2T} \\ 0, & \text{else} \end{cases};$$

$f$ represents a frequency of a signal transmitted through the higher order generalized raised cosine cascaded filter;
   T is a symbol period;
   β represents a roll-off factor that defines a roll-off transition region $$\frac{1-\beta}{2T} < |f| \leq \frac{1+\beta}{2T};$$

H(z) is a Fourier series that represents the frequency response of the cascaded filter in the roll-off transition region $$\frac{1-\beta}{2T} < |f| \leq \frac{1+\beta}{2T};$$

z is given by the following equation:

$$z = \frac{\pi T}{\beta}\left[|f| - \frac{1-\beta}{2T}\right];$$

and
   H(z) is characterized by the following formula:

$$H(z) = \frac{T}{4}[A_0 + \ldots + A_{2n+1}\cos((2n+1)z)].$$

17. A method of wireless communication comprising:
   receiving signals that have been pulse-shape modulated by a root-raised cosine transmit filter of a transmitter; and
   filtering the signals with a receive filter to remove the pulse shaping modulation;
   wherein the receive filter is a higher order Nyquist filter, and a cascaded combination of the transmit and receive filters has a frequency response equivalent to a higher order generalized raised cosine filter response.

18. The method of claim 17, further comprising
   applying pulse-shaping modulation to pre-transmitted signals using the root-raised cosine transmit filter to generate transmit signals having the pulse shaping modulation; and
   transmitting the signals through a transmit antenna.

* * * * *